UNITED STATES PATENT OFFICE.

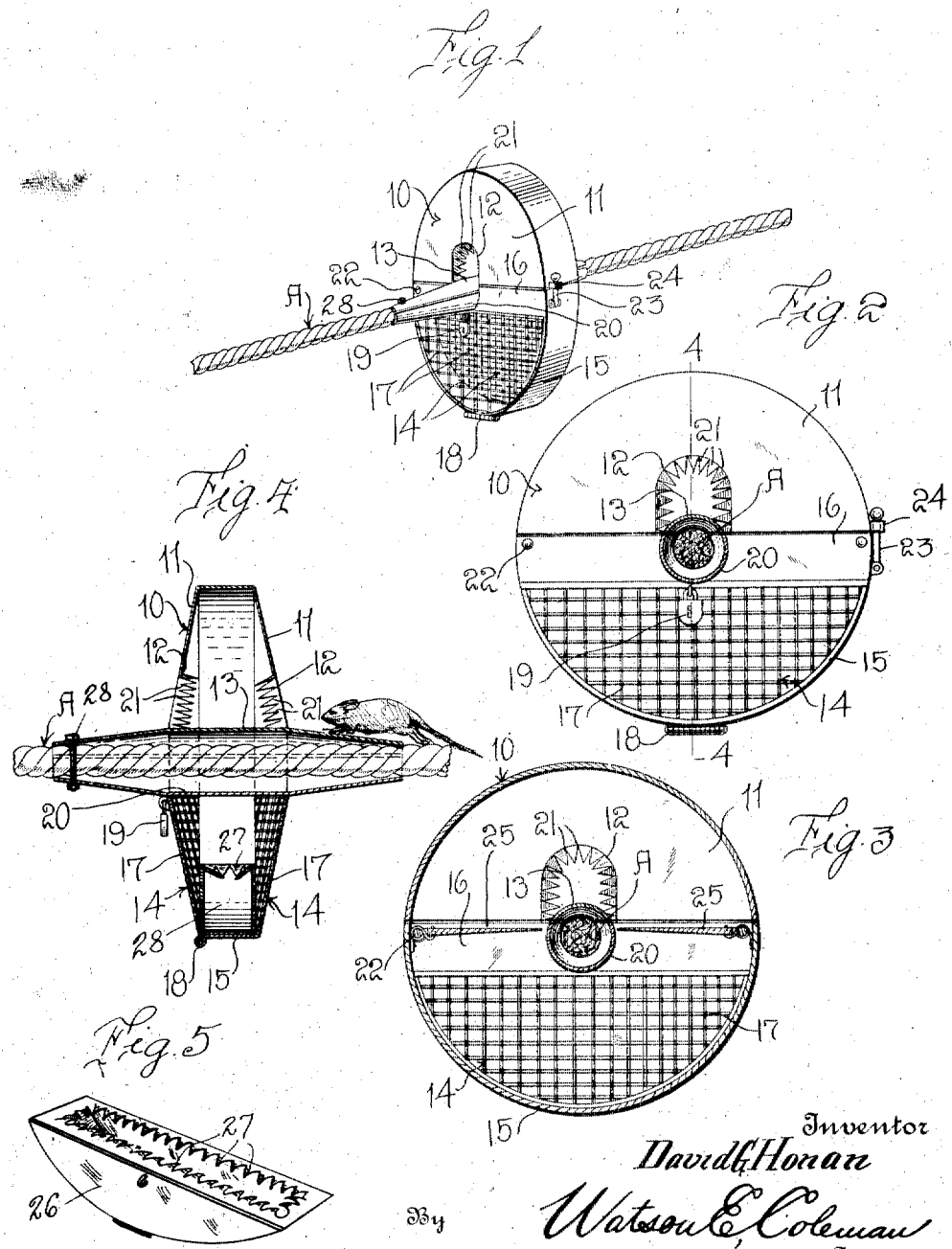

DAVID GERARD HONAN, OF NEW YORK, N. Y.

HAWSER SHIELD AND TRAP.

1,282,423.  Specification of Letters Patent.  Patented Oct. 22, 1918.

Application filed May 25, 1918. Serial No. 236,590.

*To all whom it may concern:*

Be it known that I, DAVID G. HONAN, a citizen of the United States, residing at New York city, in the county of New York and State of New York, have invented certain new and useful Improvements in Hawser Shields and Traps, of which the following is a specification, reference being had to the accompanying drawings.

This invention relates to rat traps, and the general object is to provide a rat trap and guard so constructed that it may be placed upon a hawser, for the purpose of preventing rats from climbing on board the vessel from the dock or pier.

A further object is to provide a trap so constructed that it may be readily applied to the hawser without having to be threaded thereon, and so formed that rats may be readily caught in the trap and discharged therefrom.

Other objects will appear in the course of the following description.

My invention is illustrated in the accompanying drawings, wherein:—

Figure 1 is a perspective view showing my rat trap and guard in use;

Fig. 2 is a rear elevation of the trap;

Fig. 3 is a vertical transverse section thereof; and

Fig. 4 is a vertical longitudinal section thereof.

Fig. 5 is a sectional view showing the basket in the lower portion of the trap.

Referring to these drawings it will be seen that my trap is designed to be applied upon a hawser designated A, such as the hawser extending from the vessel to the dock. The body of the trap is circular in form, so as to extend concentrically around the hawser and is of such diameter that the trap will act as a guard preventing rats from climbing over the trap and so getting upon the vessel.

The trap comprises a top portion, designated 10, which is approximately semi-circular in form and is formed to provide two end portions and a connecting web, the end portions being spaced from each other any suitable distance, as will provide sufficient room for the rat inside the trap. The ends 11 are cut away, as at 12, to provide an opening at each end, and extending beneath this opening is a semi-circular floor, as it may be termed, 13, forming part of a rope clamp, this portion 13 or section of tube extending out beyond the ends. The lower section of the trap has two ends 14 and a connecting web 15, each end 14 being composed of a metallic strip 16 and a wire mesh section 17. One of these wire mesh sections 17 is provided with a spring hinge 18 so that it may be opened to discharge the rat and is locked by means of a padlock 19 to the metallic strip 16.

Supported by the strips 16 is the semi-tubular section 20, which coacts with the semi-tubular section 13 to grip the cable. These sections 20 and 13 extend out at both ends of the trap and the tube thus formed tapers toward its ends, so that the ends of the tube thus formed may be gripped tightly upon the hawser, rope or cable so that the rat will be forced to pass through the openings 12 in order to travel along the hawser. These openings 12 are each provided with a plurality of inwardly and centrally extending prongs 21 permitting the entrance of the rat into the trap, but preventing egress therefrom. The section 10 is hinged to the lower section by means of a hinge 22 and the upper section is locked to the lower section by any suitable means, as for instance by the hinged latch 23 having a head and operating between lugs 24.

Hingedly mounted upon the side walls of the lower section are the inwardly extending platforms 25, which are hinged at their outer ends in any suitable manner, springs acting to hold the platforms in a horizontal position, these springs however being of such slight strength that when a rat steps upon the platform, the platform will fall and the rat will drop into the lower portion or cage of the trap. As soon as the rat has dropped off of the platform, the platform will return to its initial position, permitting another rat to be caught.

In the practical use of this invention, the device is clamped upon the hawser in the manner stated, and it will be obvious that any rat attempting to get on board the vessel will enter the opening 12 and that once within the opening, the inwardly projecting prongs will prevent his either retreating or advancing. Under these circumstances, the rat is liable to step upon one of the platforms, whereupon he drops into the cage from which he can be removed at any time. By forming the trap in two sections, it may be readily clamped upon the hawser at any desired point or as readily released therefrom.

Preferably, I provide an additional basket 26 disposed within the body of the trap and fitting the bottom of the trap, this basket being open at its top but provided with inwardly and medially directed prongs 27 permitting a rat to fall into the basket but preventing his exit therefrom, and this basket is preferably provided with a hinged side or door which may be opened to permit the discharge of the rat, thus doing away with the necessity of opening the shield and trap as a whole in order to get the rat out. Preferably also I provide a bolt 28, or like means, as shown in Fig. 4, which will pass through the clamping members 13 and through the hawser.

I am aware that it is common to provide hawser shields which clamp upon the hawser, and are of sufficient size to prevent a rat from climbing around the shields, but these shields do not perform the function of trapping the rat, whereas my device not only acts as an efficient shield, but also acts as a trap. It will be understood, of course, that the semi-circular or semi-tubular members 13 and 20 together act as jaws for clamping the hawser and that they project sufficiently beyond the trap as to prevent the rat from climbing down onto the reticulated portion of the trap and so climbing onto the hawser beyond the trap.

Having described my invention, what I claim is:

1. A rat trap of the character described, circular in form and comprising an upper section and a lower section, the lower section being semi-circular in form and hinged at one side to the upper section, the lower section at the upper edges of its front and rear walls being recessed to embrace a hawser and having a semi-tubular member disposed in said recess and extending beyond said front and rear walls, the upper section having an entrance opening in its front and rear walls and having an arcuate section which forms the floor of said entrance opening and coacts with the first named arcuate section to embrace the hawser, the front and rear walls of the upper section at the entrance opening being formed with inwardly projecting prongs permitting the entrance of a rat into a trap, but preventing its exit therefrom, oppositely disposed platforms carried by the lower section and held in a horizontal position by springs, one end wall of the lower section being hinged, and locking means holding said end wall closed.

2. A trap of the character described comprising an upper section having end walls, a lower section connected to the upper section, the upper and lower sections being formed with rope engaging jaws, the end walls of the upper section having entrance openings provided with inwardly and centrally extending prongs, oppositely disposed platforms carried by the lower section at its intersection with the upper section and held in a horizontal position by springs, and a removable basket disposed within the lower section and having a door, the basket being open at its top and provided with inwardly directed prongs.

In testimony whereof I hereunto affix my signature in the presence of two witnesses.

DAVID GERARD HONAN.

Witnesses:
JOHN CALLAHAN,
JEREMIAH J. HORE.